United States Patent
Osako et al.

(10) Patent No.: US 6,886,834 B2
(45) Date of Patent: May 3, 2005

(54) SHAFT SEALING ASSEMBLY

(75) Inventors: Masami Osako, Kariya (JP); Takeshi Yamada, Kariya (JP); Masakazu Murase, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/701,678

(22) Filed: Nov. 4, 2003

(65) Prior Publication Data
US 2004/0130101 A1 Jul. 8, 2004

(30) Foreign Application Priority Data
Nov. 6, 2002 (JP) .................................. 2002-322949

(51) Int. Cl.[7] ............................................. F16J 15/32
(52) U.S. Cl. ..................................... 277/558; 277/583
(58) Field of Search ............................... 277/549, 551, 277/553, 558, 578, 583

(56) References Cited

U.S. PATENT DOCUMENTS

| | | | | |
|---|---|---|---|---|
| 3,168,319 A | * | 2/1965 | Paulsen | 277/433 |
| 3,637,222 A | * | 1/1972 | Wilkinson | 277/553 |
| 4,350,347 A | | 9/1982 | Heinrich | 277/153 |
| 4,401,306 A | * | 8/1983 | Arnold | 277/558 |
| 6,513,812 B1 | * | 2/2003 | Yang et al. | 277/561 |
| 6,688,603 B2 | * | 2/2004 | vom Schemm | 277/553 |

FOREIGN PATENT DOCUMENTS

| | | | |
|---|---|---|---|
| JP | 60 159298 | 8/1985 | E21D/9/06 |
| JP | 60 175700 | 9/1985 | E21D/9/08 |
| JP | 62 031774 | 2/1987 | F16J/15/32 |
| JP | 09 303568 | 11/1997 | F16J/15/32 |
| JP | 11 351406 | 12/1999 | F16J/15/32 |
| JP | 2002-071028 | 3/2002 | F16J/15/32 |

* cited by examiner

Primary Examiner—Alison Pickard
Assistant Examiner—Vishal Patel
(74) Attorney, Agent, or Firm—Morgan & Finnegan, LLP

(57) ABSTRACT

A shaft sealing assembly seals a rotary shaft of a refrigerant compressor with a first sealing member, which is a lip seal. The first sealing member has a hollow portion. As the pressure in the interior space of the compressor housing increases, an outer wall surrounding the hollow portion is elastically deformed. Accordingly, a lip portion of the first sealing member receives a tension that weakens a force pressing the lip portion against the rotary shaft. Therefore, the sealing assembly improves the durability of the lip portion and maintains a satisfactory property of the lip portion to follow displacement of the rotary shaft at the same time.

19 Claims, 4 Drawing Sheets

Fig.1(a)
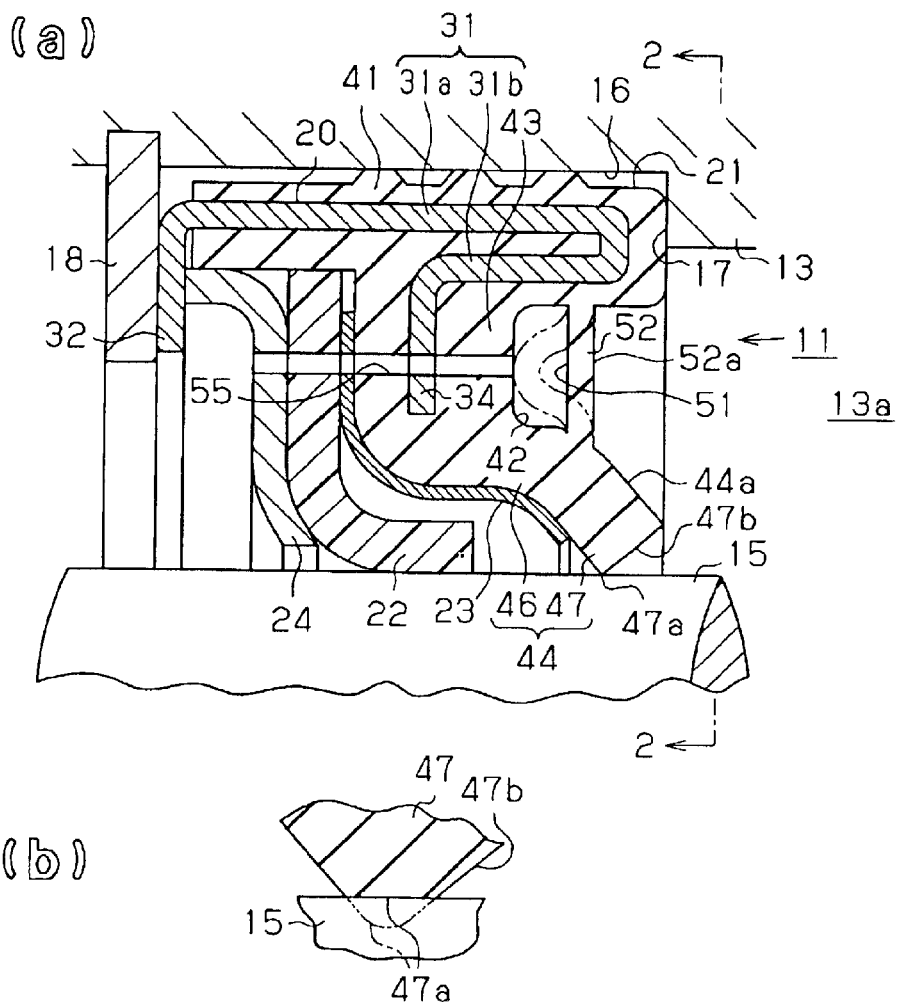
Fig.1(b)
Fig.2
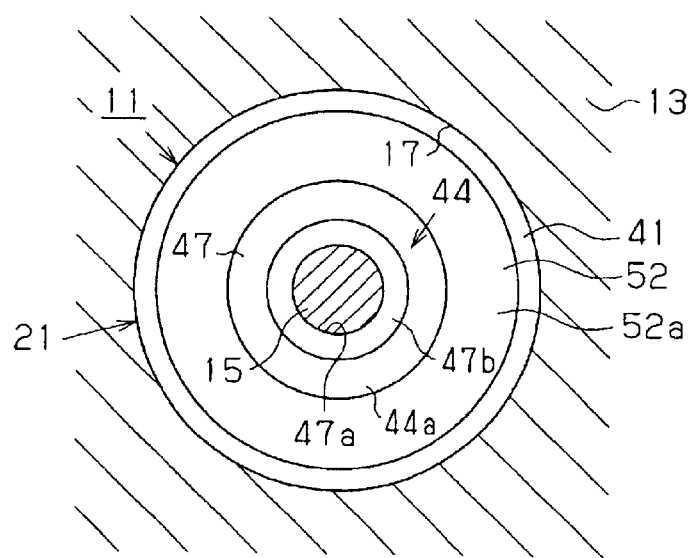

SHAFT SEALING ASSEMBLY

BACKGROUND OF THE INVENTION

The present invention relates to a shaft sealing assembly that is used in a refrigerant compressor installed in a refrigeration circuit and seals a rotary shaft of the compressor with a lip seal.

In such a shaft sealing assembly, the internal pressure of a refrigerant compressor acts on a lip portion of the lip seal. The force with which the lip portion is pressed against the rotary shaft is adjusted in accordance with the internal pressure. This is referred to as "self-sealing" function. However, an excessively high internal pressure excessively increases the pressing force of the lip portion applied to the rotary shaft, which causes the lip portion to be abnormally worn.

To prevent the abnormal wear, Japanese Laid-Open Patent Publication No. 2002-71028 discloses a configuration in which a space surrounding the back of a lip portion is filled with an annular elastic member. The elastic member receives an excessive internal pressure of a refrigerant compressor and prevents the excessive pressure from acting on the back of the lip portion. Therefore, the pressing force of the lip portion acting on the rotary shaft is prevented from being excessive, and the lip portion is prevented from being abnormally worn. Accordingly, the durability of the lip portion is improved.

However, the elastic member reduces the flexibility of the lip portion and thus prevents the lip portion from readily following displacement of the rotary shaft. This lowers the effectiveness of the lip seal.

The above-mentioned publication recites that the elastic member is made of a material that is softer than the lip portion, so that the property of the lip portion to follow displacement of the rotary shaft is maintained. However, even if a material that is softer than that of the lip portion is used for the elastic member, filling the space surrounding the back of the lip portion with the elastic member lowers the flexibility of the lip portion compared to a case where the space is not filled with any member. Therefore, the sealing assembly of the above mentioned publication can hardly improve the durability of the lip portion and maintain a satisfactory property of the lip portion to follow displacement of the rotary shaft at the same time.

SUMMARY OF THE INVENTION

Accordingly, it is an objective of the present invention to provide a sealing assembly that improves the durability of a lip portion and maintain a satisfactory property of the lip portion to follow displacement of a shaft at the same time.

To achieve the above-mentioned objective, the present invention provides a shaft sealing assembly for a machine that includes an interior space and a shaft extending from the interior space to the outside. The shaft sealing assembly is provided about the shaft to seal the interior space from the outside. The shaft sealing assembly includes a lip seal having an annular lip portion that contacts the circumference of the shaft. An outer wall is provided on the lip seal. The outer wall defines a hollow portion in the lip seal and encompasses the hollow portion. The outer wall is coupled to the lip portion. The outer wall is elastically deformed in accordance with an increase of the pressure in the interior space, thereby applying a tension to the lip portion. The tension acts in a direction to weaken a pressing force of the lip portion applied to the shaft.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1(*a*) is a cross-sectional view illustrating an upper half of a shaft sealing assembly according to a first embodiment of the present invention;

FIG. 1(*b*) is an enlarged view illustrating a distal portion of the lip portion of the shaft sealing assembly shown in FIG. 1(*a*);

FIG. 2 is a cross-sectional view taken along line 2—2 in FIG. 1(*a*);

DETAILED DESCRIPTION OF THE PREFERRED EMBODIMENTS

Figure 3:
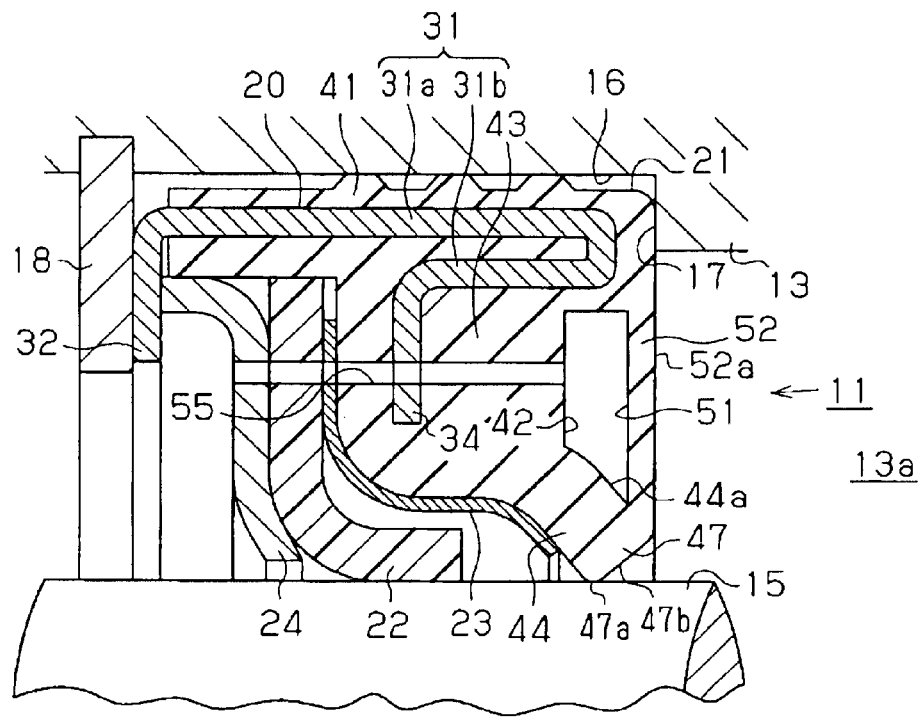
FIG. 3 is a cross-sectional view illustrating a shaft sealing assembly according to a second embodiment of the present invention.

First to fourth embodiments of the present invention will be described in the following. In the second to fourth embodiments, only the parts different from the first embodiment are explained. Like members are given the like numbers and detailed explanations are omitted.

The first embodiment will now be described. As shown in FIG. 1(*a*), a shaft sealing assembly of the first embodiment is used in a refrigerant compressor installed in a refrigeration circuit of a vehicle air conditioner. The shaft sealing assembly 11 is provided between a compressor housing 13 and a rotary shaft 15 of the refrigerant compressor, and is used for sealing an interior space 13*a* of the compressor housing 13 (the interior space of the refrigerant compressor) against leakage of high-pressure refrigerant. FIG. 1(*a*) shows an upper half of the cross-section of the shaft sealing assembly 11. The interior space 13*a* is located to the right of the shaft sealing assembly 11 as viewed in FIG. 1(*a*). The left of the shaft sealing assembly 11 is the outside of the compressor housing 13 (the outside of the refrigerant compressor). Carbon dioxide is used as refrigerant.

The shaft sealing assembly 11 is accommodated in an accommodation chamber 16 defined in the compressor housing 13 about the rotary shaft 15. The shaft sealing assembly 11 is held between a step portion 17 formed in the compressor housing 13 and a snap ring 18 attached to the compressor housing 13.

The shaft sealing assembly 11 includes a metal outer case (frame) 20, a lip seal, which is a rubber first sealing member 21, a resin second sealing member 22, and first and second metal backup rings 23, 24.

The outer case 20 includes a double cylindrical main body 31 and first and second flanges 32, 34. The main body 31 includes an outer cylinder 31a and an inner cylinder 31b. The inner cylinder 31b is formed by folding the main body 31 inward at the inner end of the outer cylinder 31a (the right end as viewed in FIG. 1(a)). The first flange 32 extends radially inward from the outer end of the outer cylinder 31a (the left end as viewed in FIG. 1(a)). The second flange 34 extends radially inward from the distal end of the inner cylinder 31b. From the side corresponding to the interior space 13a toward the outside of the compressor housing 13, the first backup ring 23, the second sealing member 22, and the second backup ring 24 are arranged in this order in the outer case 20. The first backup ring 23, the second sealing member 22, and the second backup ring 24 are held by the flanges 32, 34.

The second sealing member 22 is made of a fluorocarbon resin such as polytetrafluoroethylene (PTFE). The second sealing member 22 is pressed by the pressure in the interior space 13a with the rotary shaft 15, and thus functions as a seal. The second sealing member 22 is supported by the second backup ring 24. The contacting state of the second sealing member 22 to the rotary shaft 15 is reliably maintained by the second backup ring 24, which guarantees a stable sealing performance and prevents premature wearing of the second sealing member 22.

The first sealing member 21 is fixed to the portions of the outer case 20 except for the first flange 32, that is, to the main body 31 and the second flange 34. The first sealing member 21 is made of rubber such as acrylonitrile-butadiene-styrene rubber. The first sealing member 21 includes a main body coating portion 41. The main body coating portion 41 coats the outer and inner circumferences of the main body 31. The main body coating portion 41 elastically contacts the inner circumference of the compressor housing 13 and functions as a seal. The first sealing member 21 has a flange coating portion 43 and an annular lip portion 44. The flange coating portion 43 coats both sides of the second flange 34. The lip portion 44 extends from the inner circumference of the flange coating portion 43 toward the interior space 13a. The main body coating portion 41 and the flange coating portion 43 form a main body of the first sealing member 21, in other words, a main body of the lip seal.

The lip portion 44 includes a base portion 46 that is shaped as a short cylinder and an extension portion 47. The base portion 46 extends from the inner circumference of the flange coating portion 43 toward the interior space 13a and substantially along the axis of the rotary shaft 15. The extension portion 47 extends from the distal end of the base portion 46 toward the interior space 13a. The diameter of the extension portion 47 decreases toward the interior space 13a. Therefore, the lip portion 44 is bent between the base portion 46 and the extension portion 47. A distal end 47a of the extension portion 47 contacts the rotary shaft 15 in an annular area.

As shown in FIG. 1(b), the distal end 47a of the extension portion 47 contacts the rotary shaft 15 at a relatively large area. However, prior to installation of the shaft sealing assembly 11 in the refrigerant compressor, that is, in a state where the rotary shaft 15 is removed from the state of FIGS. 1(a) and 1(b), the distal end 47a of the extension portion 47 is pointed toward the axis of the shaft sealing assembly 11 and is located in the region of the rotary shaft 15 as shown by alternate long and two short dashes line in FIG. 1(b). Also, an end surface 47b of the extension portion 47 is exposed to the interior space 13a. The entire circumference of the end surface 47b is inclined relative to the circumference of the rotary shaft 15 at an angle.

The first sealing member 21 has a hollow portion 51. The shaft sealing assembly 11, in which the first sealing member 21 has the hollow portion 51, prevents the pressing force of the lip portion 44 applied to the rotary shaft 15 from being excessive due to an increase of the pressure in the interior space 13a, thereby preventing the lip portion 44 from being abnormally worn.

That is, as shown in FIGS. 1(a) and 2, the first sealing member 21 has an annular recess 42 defined by the main body coating portion 41, the flange coating portion 43, and the lip portion 44. The annular recess 42 opens to the interior space 13a. An annular wall portion 52 is accommodated in the annular recess 42. The outer circumference of the wall portion 52 is connected to the inner circumference of the main body coating portion 41. The inner circumference of the wall portion 52 is connected to a back surface 44a, which is a radially outer surface of the lip portion 44, at the boundary between the base portion 46 and the extension portion 47. That is, the main body of the first sealing member 21 (specifically, the main body coating portion 41, which forms a part of the main body) and the lip portion 44 are bridged by the wall portion 52. The wall portion 52 has a pressure receiving surface 52a that is exposed to the interior space 13a. The pressure receiving surface 52a lies perpendicular to the axis of the rotary shaft 15. In other words, the pressure receiving surface 52a of the wall portion 52 is not inclined relative to a plane perpendicular to the axis of the rotary shaft 15. The wall portion 52 functions as a pressure receiving portion.

The hollow portion 51 is defined by the main body coating portion 41, the flange coating portion 43, the base portion 46 of the lip portion 44, and the wall portion 52. The hollow portion 51 is annular and exists about the rotary shaft 15. The main body coating portion 41, the flange coating portion 43, the base portion 46, and the wall portion 52 form an outer wall that surrounds the hollow portion 51.

The wall portion 52 is made of the same material as that of the first sealing member 21. In other words, the wall portion 52 is made of rubber and can be elastically deformed. When the wall portion 52 is elastically deformed, the force based on the elastic deformation of the wall portion 52 acts on the main body coating portion 41 and the lip portion 44, which are coupled to each other by the wall portion 52.

The wall portion 52 may be separately formed (molded) from the first sealing member 21, and welded or adhered to the first sealing member 21 afterwards. Alternatively, the wall portion 52 may be integrally molded with the first sealing member 21 in a state separated from one of the main body coating portion 41 and the lip portion 44. And after the molding, the wall portion 52 may be welded or adhered to the one of the main body coating portion 41 and the lip portion 44.

The hollow portion 51 is opened to the outside of the refrigerant compressor, or to the atmosphere. That is, a through hole 55 extends through the flange coating portion 43, the second flange 34, the first backup ring 23, the second sealing member 22, and the second backup ring 24. The through hole 55 connects the hollow portion 51 with the outside of the refrigerant compressor.

When the pressure in the interior space 13a is low, the lip portion 44 is pressed against the rotary shaft 15 by the own elastic force. Accordingly, the first seal member 21 seals the rotary shaft 15. When the pressure in the interior space 13a increases, the pressure acts on the back surface 44a of the lip portion 44 (specifically, a portion of the back surface 44a that is exposed to the interior space 13a). This increases the pressing force of the lip portion 44 applied to the rotary shaft 15 (This increase of the pressing force is referred to as "self-sealing" function).

As shown by alternate long and two short dashes line in FIG. 1(a), due to the increase of the pressure in the interior space 13a, which acts on the pressure receiving surface 52a of the wall portion 52, the wall portion 52 is flexed, or elastically deformed, against the pressure in the hollow portion 51 (the atmospheric pressure) toward the outside of the housing 13 (toward the flange coating portion 43). As described above, the outer circumference of the wall portion 52 is coupled to the main body coating portion 41, which is, in turn, fixed to the compressor housing 13. The outer case 20, which is made of rigid metal, is located in the main body coating portion 41.

The elastic deformation of the wall portion 52 applies tension to the lip portion 44 of the first sealing member 21, which is coupled to the inner circumference of the wall portion 52. The tension is directed radially outward relative to the rotary shaft 15 and weakens the pressing force that presses the lip portion 44 applied to the rotary shaft 15. Since the amount of elastic deformation of the wall portion 52 increases as the pressure in the interior space 13a increases, the tension acting on the lip portion 44 increases as the pressure in the interior space 13a increases.

Therefore, the pressing force of the lip portion 44 applied to the rotary shaft 15 is increased at a more gradual rate according to increase of the pressure in the interior space 13a compared to a case in which the wall portion 52 is not provided, that is, a case in which the hollow portion 51 is not provided. Thus, even if the pressure in the interior space 13a is increased, the pressing force of the lip portion 44 applied to the rotary shaft 15 does not become excessive, which prevents the lip portion 44 from being abnormally worn.

When the amount of deformation of the wall portion 52 reaches a predetermined amount as shown by alternate long and two short dashes line in FIG. 1(a) due to an increase of the pressure in the interior space 13a, the apex of the flection of the wall portion 52 contacts the flange coating portion 43. The flange coating portion 43 thus limits elastic deformation of the wall portion 52 due to an increase of the pressure in the interior space 13a so that the deformation does not surpass the predetermined amount. That is, the flange coating portion 43, which faces the wall portion 52, functions as a limiting portion that limits an elastic deformation of the wall portion 52 below a predetermined level.

The present embodiment has the following advantages.

(1) Since the first sealing member 21 has the hollow portion 51, the lip portion 44 is prevented from being abnormally worn. This improves the durability of the lip portion 44. Also, since the hollow portion 51 is close to the back surface 44a of the lip portion 44, the lip portion 44 is easily deformed to conform to displacement of the rotary shaft 15 compared to Japanese Laid-Open Patent Publication No. 2002-71028, in which no hollow portion is provided close to the lip portion. Therefore, the present invention favorably maintains the sealing performance of the lip portion 44.

(2) The hollow portion 51 is open to the atmosphere. Therefore, even if high pressure fluid (carbon dioxide) penetrates from the interior space 13a to the hollow portion 51, the penetrated fluid is dispersed to the atmosphere. The pressure in the hollow portion 51 is thus prevented from being excessively increased. That is, the pressure in the hollow portion 51 is maintained to the atmospheric pressure. Thus, as the pressure in the interior space 13a increases, the shaft sealing assembly 11 reliably deforms the part of the outer wall (wall portion 52) that surrounds the hollow portion 51. The lip portion 44 is therefore reliably prevented from being abnormally worn.

(3) An elastic deformation of the wall portion 52 beyond a predetermined amount is limited by contact between the wall portion 52 and the flange coating portion 43. Therefore, the joint between the wall portion 52 and the lip portion 44 is prevented from being broken by an excessive deformation of the wall portion 52, or an excessive tension applied to the lip portion 44.

(4) The wall portion 52 is connected to the lip portion 44 of the first sealing member 21 such that a part of the back surface 44a of the lip portion 44 is exposed to the interior space 13a. Therefore, compared to a case where the wall portion 52 is connected to the lip portion 44 such that the back surface 44a is not exposed to the interior space 13a at all (see the second embodiment (FIG. 3)), the self-sealing function of the lip portion 44 is reliably presented. Therefore, even if the pressure in the interior space 13a varies, the sealing performance of the lip portion 44 and the durability of the lip portion 44 are significantly improved at the same time.

(5) In the shaft sealing assembly 11, which is used in the refrigerant compressor, the lip portion 44 of the first sealing member 21 slides on the rotary shaft 15 at a high speed. That is, compared to a shaft sealing assembly used, for example, in a steering apparatus of a vehicle, the lip portion 44 in a shaft sealing assembly 11 used in a refrigerant compressor needs to reliably follow displacement of the rotary shaft 15. Since carbon dioxide is used as refrigerant, the internal pressure of the refrigerant compressor is far higher than the internal pressure of a compressor using chlorofluorocarbon refrigerant. That is, in the shaft sealing assembly 11 used in the compressor using carbon dioxide as refrigerant, the durability of the lip portion 44 needs to be further improved compared to a case of a shaft sealing assembly in a compressor using chlorofluorocarbon as refrigerant.

Therefore, applying the shaft sealing assembly 11 to a compressor using carbon dioxide as refrigerant is particularly advantageous to improve the durability of the lip portion 44 and allow the lip portion 44 to reliably follow displacement of the rotary shaft 15.

A second embodiment of the present invention will now be described. As shown in FIG. 3, the inner circumference of the wall portion 52 of the second embodiment is connected to a part of the back surface 44a of the lip portion 44 that is closest to the interior space 13a. The outer circumference of the wall portion 52 is connected to a part of the inner surface of the main body coating portion 41 that is closest to the interior space 13a. In other words, the wall portion 52 is connected to the open end of the recess 42, which is defined by the main body coating portion 41, the flange coating portion 43, and the lip portion 44. That is, the wall portion 52 is shifted toward the interior space 13a compared to the first embodiment, and the back surface 44a of the lip portion 44 is not exposed to the interior space 13a at all.

Since the back surface 44a of the lip portion 44 is not exposed to the interior space 13a, the back surface 44a does not receive the pressure in the interior space 13a. Thus, even if the pressure in the interior space 13a is increased, the pressing force of the lip portion 44 applied to the rotary shaft 15 does not become excessive.

Figure 4:
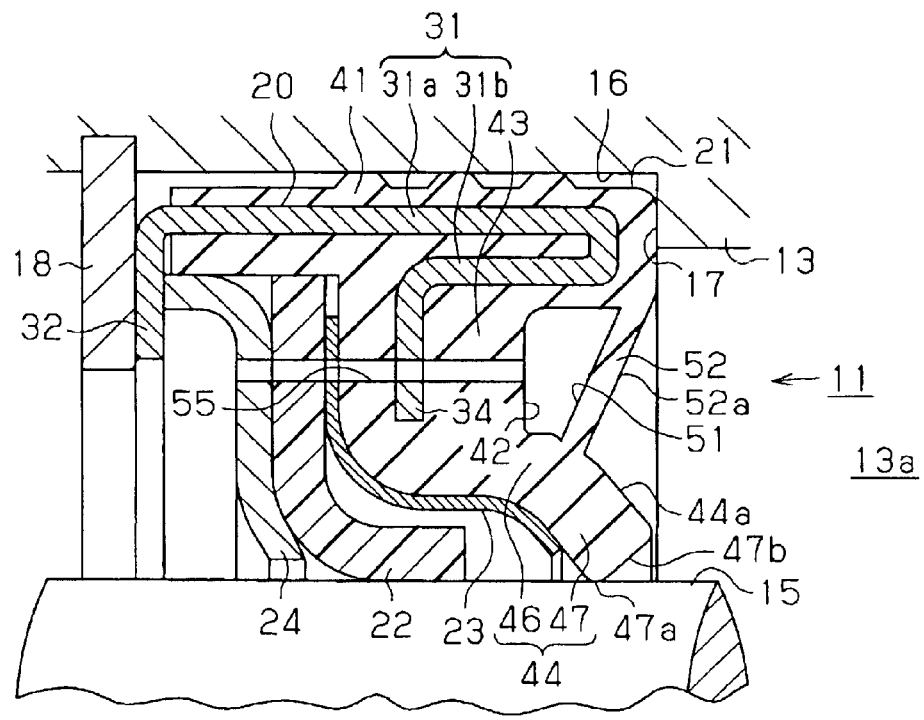
FIG. 4 is a cross-sectional view illustrating a shaft sealing assembly according to a third embodiment of the present invention.

A third embodiment of the present invention will now be described. As shown in FIG. 4, the outer circumference of the wall portion 52 of the third embodiment is connected to a part of the inner surface of the main body coating portion 41 that is closest to the interior space 13a. That is, the pressure receiving surface 52a of the wall portion 52 is inclined relative to a plane perpendicular to the axis of the rotary shaft 15 such that the joint between the pressure receiving surface 52a and the main body coating portion 41 is located further inward of the interior space 13a than the joint between the pressure receiving surface 52a and the lip portion 44.

Therefore, the pressure in the interior space 13a, which acts on the pressure receiving surface 52a of the wall portion 52, not only elastically deforms the wall portion 52, but also pushes the entire wall portion 52 away from the rotary shaft 15. Therefore, compared to a case in which the pressure receiving surface 52a of the wall portion 52 is not inclined relative to a plane perpendicular to the axis of the rotary shaft 15 (for example, the first embodiment), tension acting on the lip portion 44 to loosen the force acting on the rotary shaft 15 is increased. As a result, even if the pressure in the interior space 13a is increased, the pressing force of the lip portion 44 applied to the rotary shaft 15 does not become excessive.

Figure 5:
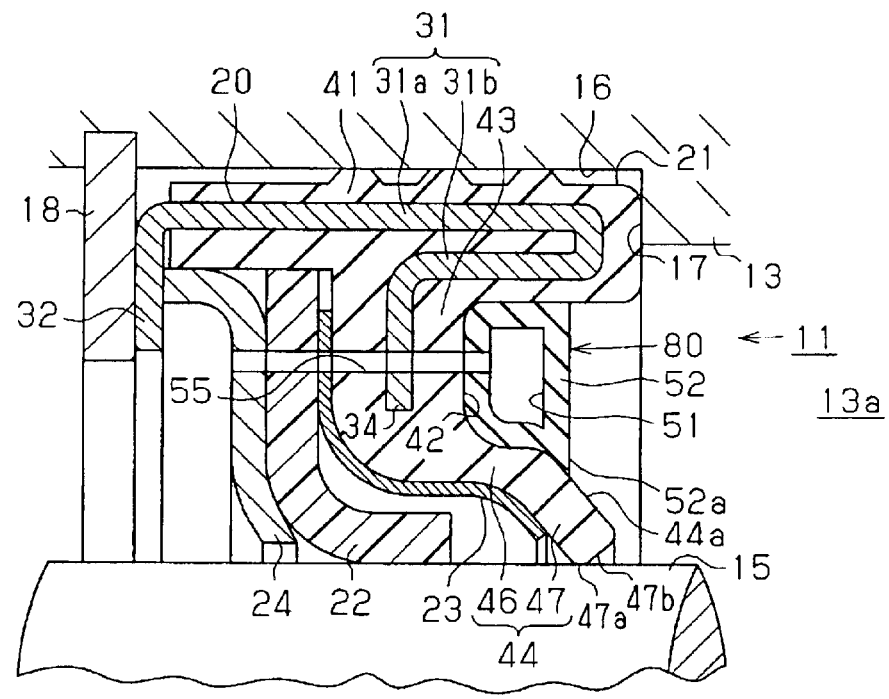
FIG. 5 is a cross-sectional view illustrating a shaft sealing assembly according to a fourth embodiment of the present invention.

A fourth embodiment of the present invention will now be described. As shown in FIG. 5, the hollow portion 51 is formed by an annular member 80 that is separately formed from the first sealing member 21.

That is, the annular member 80 is accommodated in the recess 42, which is formed in the first sealing member 21 and opens to the interior space 13a. The hollow portion 51 is defined in the annular member 80. The hollow portion 51 is annular and surrounds the rotary shaft 15. The annular member 80 functions as an outer wall that surrounds the hollow portion 51. The annular member 80 is made, for example, by joining the ends of a tube. A part of the annular member 80 that faces the inner surface of the recess 42 is shaped to conform to the inner surface of the recess 42, or to the main body coating portion 41, the flange coating portion 43, and the lip portion 44. A part of the annular member 80 that faces the inner surface of the recess 42 closely contacts and adhered to the inner surface of the recess 42.

In this embodiment, a part of the annular member 80 that is exposed to the interior space 13a functions as the wall portion 52, which connects a part of the main body of the first sealing member 21 (the main body coating portion 41) to the lip portion 44.

When manufacturing the shaft sealing assembly 11, the completed hollow portion 51 (the annular member 80) can be separately prepared from the first sealing member 21. Therefore, unlike the first embodiment, the hollow portion 51 need not be formed in the first sealing member 21, which reduces subtle procedures. As a result, the manufacture of the shaft sealing assembly 11 is facilitated.

It should be apparent to those skilled in the art that the present invention may be embodied in many other specific forms without departing from the spirit or scope of the invention. Particularly, it should be understood that the invention may be embodied in the following forms.

Figure 6:
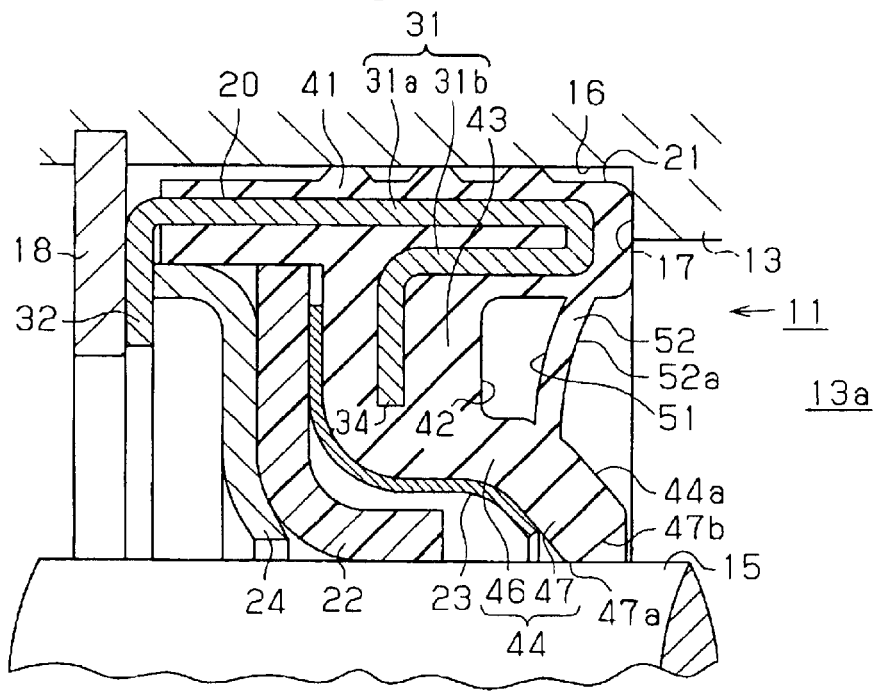
FIG. 6 is a cross-sectional view illustrating a shaft sealing assembly according to a modification of the present invention.

The third embodiment of FIG. 4 may be modified as shown in FIG. 6, such that the wall portion 52 is shaped as a concave that is curved toward the hollow portion 51. This provides the same advantages as the third embodiment.

In the illustrated embodiments, the hollow portion 51 is opened to the outside of the compressor housing 13. However, as shown in FIG. 6, for example, the through hole 55 for opening the hollow portion 51 to the outside of the housing 13 may be omitted so that the hollow portion 51 is not open to the outside of the housing 13.

Figure 7:
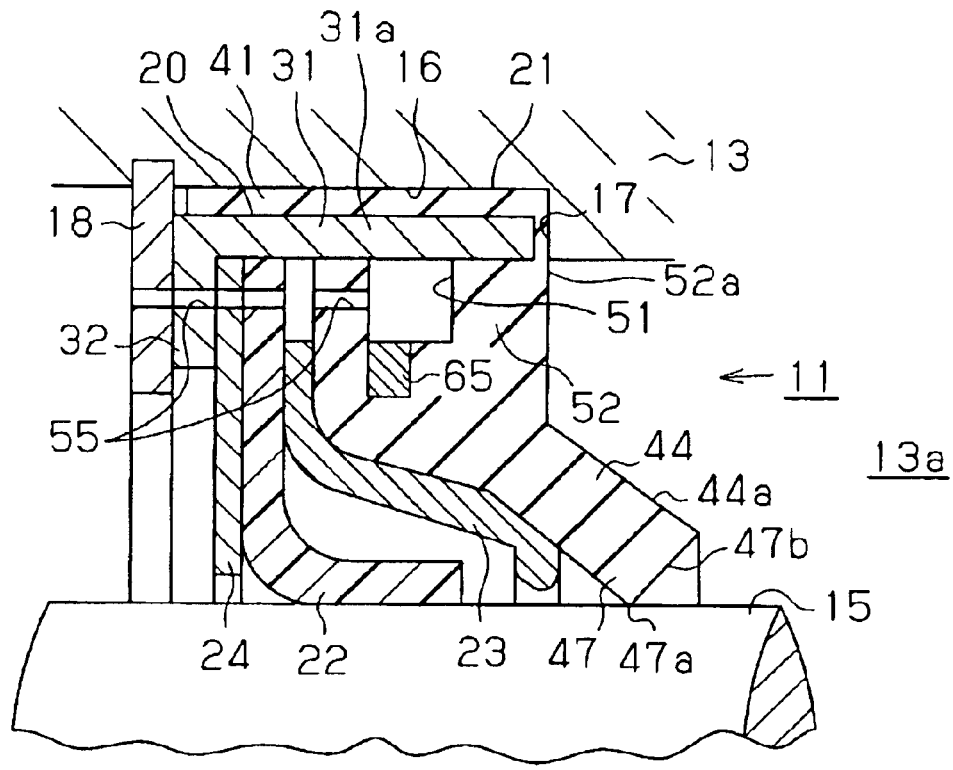
FIG. 7 is a cross-sectional view illustrating a shaft sealing assembly according to another modification of the present invention.

The illustrated embodiments may be modified as shown in FIG. 7, such that a part of the outer wall surrounding the hollow portion 51 is formed with the outer case 20, which holds the first sealing member 21. That is, the outer wall may be formed of the outer case 20 and the first sealing member 21, which is installed in the outer case 20. In this modification, the hollow portion 51 is completed at the same time as the installation of the first sealing member 21 to the outer case 20. In this modification, the hollow portion 51 need not be completed in the first sealing member 21, which facilitates the manufacture of the shaft sealing assembly 11.

In the modification of FIG. 7, the outer case 20 includes the outer cylinder 31a and the first flange 32, and the inner cylinder 31b and the second flange 34 are omitted. The second sealing member 22 and the first and second backup rings 23, 24 are held by the first flange 32 and a holding ring 65, which is embedded in the first sealing member 21. The holding ring 65 forms a part of the outer wall that surrounds the hollow portion 51.

Figure 8:
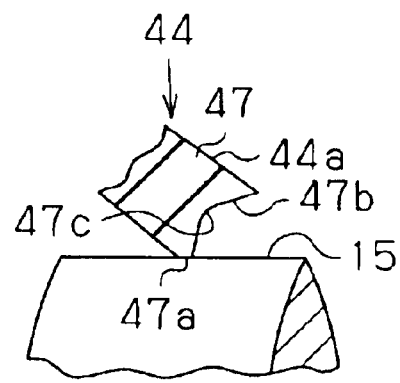
FIG. 8 is an enlarged cross-sectional view illustrating a lip portion of a shaft sealing assembly according to another modification.

In the illustrated embodiment, the entire end surface 47b of the extension portion 47 is inclined relative to the circumference of the rotary shaft 15 at an angle. However, for example, a groove 47c may be formed in the end surface 47b of the lip portion 44 as shown in FIG. 8. When the end surface 47b of the extension portion 47 is pressed against the rotary shaft 15 by the pressure in the interior space 13a, a space is readily created between the end surface 47b and the rotary shaft 15. The pressure of fluid that enters the space from the interior space 13a produces a force that weakens the pressing force of the extension portion 47 applied to the rotary shaft 15. Accordingly, the force with which the lip portion 44 is pressed against the rotary shaft 15 is prevented from being excessive.

In the illustrated embodiments, the single annular hollow portion 51 is located about the rotary shaft 15. However, a plurality of hollow portions may be arranged about the rotary shaft 15.

In the illustrated embodiments, a hollow portion may be formed in the second sealing member 22, which is a lip seal.

The present invention may be applied to a shaft sealing assembly used in a compressor using chlorofluorocarbon as refrigerant.

The present invention is not limited to shaft sealing assemblies for refrigerant compressors, but may be applied to shaft sealing assemblies for other types of rotating machines such as an oil pump and an internal combustion engine.

The present examples and embodiments are to be considered as illustrative and not restrictive and the invention is not to be limited to the details given herein, but may be modified within the scope and equivalence of the appended claims.

What is claimed is:

1. A shaft sealing assembly for a machine that includes an interior space and a shaft extending from the interior space to the outside, wherein the shaft sealing assembly is provided about the shaft to seal the interior space from the outside, the shaft sealing assembly comprising:

a lip seal having an annular lip portion that contacts the circumference of the shaft; and an outer wall provided on the lip seal, wherein the outer wall defines a hollow portion in the lip seal and encompasses the hollow portion, the outer wall being coupled to the lip portion, wherein the outer wall is elastically deformed in accordance with an increase of the pressure in the interior space, thereby applying a tension to the lip portion, the tension acting in a direction to weaken a pressing force of the lip portion applied to the shaft.

2. The shaft sealing assembly according to claim 1, wherein the lip portion increases the pressing force according to an increase of the pressure in the interior space.

3. The shaft sealing assembly according to claim 1, wherein the hollow portion is open to the outside of the machine.

4. The shaft sealing assembly according to claim 1, further comprising a limiting portion that prevents the outer wall from being elastically deformed beyond a predetermined amount.

5. The shaft sealing assembly according to claim 1, wherein the outer wall includes a pressure receiving portion that receives the pressure in the interior space, and wherein the pressure receiving portion is elastically deformed in accordance with an increase of the pressure in the interior space.

6. The shaft sealing assembly according to claim 5, wherein the machine includes a housing that defines the interior space, wherein the lip seal includes an annular main body fixed to the housing, wherein the lip portion extends radially inward from the main body, wherein the pressure receiving portion is an annular wall portion that couples the main body to the lip portion, and wherein the hollow portion is defined by the main body, the lip portion, and the wall portion.

7. The shaft sealing assembly according to claim 6, wherein the wall portion includes a pressure receiving surface that receives the pressure in the interior space, and wherein the pressure receiving surface is perpendicular to an axis of the shaft.

8. The shaft sealing assembly according to claim 6, wherein the wall portion includes a pressure receiving surface that receives the pressure in the interior space, and wherein the pressure receiving surface includes a radially outer end coupled to the main body and a radially inner end coupled to the lip portion, and wherein the pressure receiving surface is inclined relative to a plane perpendicular to an axis of the shaft such that the radially outer end is located further inward of the interior space relative to the radially inner end with respect to the axial direction of the shaft.

9. The shaft sealing assembly according to claim 6, wherein the lip portion includes a cylindrical base portion and an extension portion, wherein the base portion extends from the main body toward the interior space substantially along the axis of the shaft, wherein the extension portion extends from a distal end of the base portion toward the interior space while decreasing the diameter, and wherein the wall portion is coupled to the lip portion at the boundary between the base portion and the extension portion.

10. The shaft sealing assembly according to claim 6, wherein the outer wall is formed of an annular member having the hollow portion, and wherein the annular member is attached to the main body and the lip portion.

11. The shaft sealing assembly according to claim 1, wherein the lip seal is held by a frame, and wherein the frame forms a part of the outer wall.

12. The shaft sealing assembly according to claim 1, wherein at least part of a radially outside surface of the lip portion is exposed to the interior space.

13. The shaft sealing assembly according to claim 1, wherein a radially outside surface of the lip portion is not exposed to the interior space.

14. The shaft sealing assembly according to claim 1, wherein the lip portion includes an end surface exposed to the interior space, and wherein a groove is formed in the end surface.

15. The shaft sealing assembly according to claim 1, wherein the machine is a compressor for compressing refrigerant in a refrigeration circuit, and wherein the shaft is the rotary shaft of the compressor.

16. The shaft sealing assembly according to claim 15, wherein carbon dioxide is used as the refrigerant.

17. A shaft sealing assembly for a machine that includes a housing defining an interior space and a shaft extending from the interior space to the outside, wherein the shaft sealing assembly comprises an annular lip seal, wherein the lip seal is provided about the shaft to seal the interior space from the outside, wherein the lip seal includes:

a main body fixed to the housing;

an annular lip portion that extends radially inward from the main body and contacts the circumference of the shaft, wherein the pressure in the interior space presses the lip portion against the circumference of the shaft; and an annular wall portion coupling the main body to the lip portion, wherein the main body, the lip portion, and the wall portion define a hollow portion in the lip seal, wherein the wall portion is elastically deformed in accordance with an increase of the pressure in the interior space, thereby applying a radially outward force to the lip portion.

18. A shaft sealing assembly for a compressor for compressing refrigerant in a refrigeration circuit, wherein the compressor includes a housing defining an interior space and a rotary shaft extending from the interior space to the outside, wherein the shaft sealing assembly comprises an annular lip seal, wherein the lip seal is provided about the rotary shaft to seal the interior space from the outside, wherein the lip seal includes:

a main body fixed to the housing;

an annular lip portion that extends radially inward from the main body and contacts the circumference of the rotary shaft, wherein the pressure in the interior space presses the lip portion against the circumference of the rotary shaft; and an annular wall portion coupling the main body to the lip portion, wherein the main body, the lip portion, and the wall portion define a hollow portion in the lip seal, wherein the wall portion is elastically deformed in accordance with an increase of the pressure in the interior space, thereby applying a radially outward force to the lip portion.

19. The shaft sealing assembly according to claim 18, wherein carbon dioxide is used as the refrigerant.

* * * * *